(12) United States Patent
Chin et al.

(10) Patent No.: US 6,279,065 B1
(45) Date of Patent: Aug. 21, 2001

(54) COMPUTER SYSTEM WITH IMPROVED MEMORY ACCESS

(75) Inventors: Kenneth T. Chin, Cypress; Jerome J. Johnson; Phillip M. Jones, both of Spring; Robert A. Lester, Houston; Gary J. Piccirillo, Cypress, all of TX (US); C. Kevin Coffee, Pembroke, FL (US); Michael J. Collins, Tomball, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/090,271

(22) Filed: Jun. 3, 1998

(51) Int. Cl.⁷ .................. G06F 13/38; G06F 13/00; G06F 12/00
(52) U.S. Cl. .................. 710/129; 710/128; 710/57; 710/107; 710/56; 711/149; 709/227
(58) Field of Search .................. 395/821; 710/129, 710/128, 57, 68, 107; 709/227, 238; 711/101, 104, 105, 149, 151, 155, 154, 158, 167; 370/428

(56) References Cited

U.S. PATENT DOCUMENTS

| | | | |
|---|---|---|---|
| 3,916,384 | * 10/1975 | Fleming et al. | 711/151 |
| 4,330,824 | * 5/1982 | Girard | 710/129 |
| 5,117,486 | * 5/1992 | Clark et al. | 710/128 |
| 5,268,962 | * 12/1993 | Abadi et al. | 380/21 |
| 5,307,345 | * 4/1994 | Lozowick et al. | 370/428 |
| 5,377,338 | * 12/1994 | Olson et al. | 710/22 |
| 5,459,842 | * 10/1995 | Begun et al. | 711/155 |
| 5,495,422 | * 2/1996 | Olson | 395/500.22 |
| 5,535,341 | * 7/1996 | Shah et al. | 710/126 |
| 5,537,555 | * 7/1996 | Landry et al. | 710/126 |
| 5,581,729 | * 12/1996 | Nishtala et al. | 711/143 |
| 5,613,075 | * 3/1997 | Wade et al. | 710/107 |
| 5,634,068 | * 5/1997 | Nishtala et al. | 711/141 |
| 5,634,073 | 5/1997 | Collins et al. | 395/825 |
| 5,638,534 | * 6/1997 | Mote, Jr. | 711/158 |
| 5,644,753 | * 7/1997 | Ebrahim et al. | 711/131 |
| 5,655,100 | * 8/1997 | Ebrahim et al. | 711/144 |
| 5,657,472 | * 8/1997 | Van Loo et al. | 711/158 |
| 5,666,494 | * 9/1997 | Mote, Jr. | 711/167 |
| 5,668,967 | * 9/1997 | Olson et al. | 710/22 |
| 5,684,977 | * 11/1997 | Van Loo et al. | 713/143 |

(List continued on next page.)

OTHER PUBLICATIONS

VLSI Digital Signal Processors by Vijay K. Madisetti (Georgia Institute of Technology) Chapter 3, pp 61–63; Butterworth–Heinemann.

IBM TDB, "RAM BIT Line Isolation", vol. 27, No. 4B, Sep. 1994, pp. 2632–2635.*

IBM TDB, "Caching Mechanism for 32–Bit ECC with Variable System Data Block Size", vol. 37, No. 1, Jan. 1994, pp. 369–372.*

*Primary Examiner*—Thomas Lee
*Assistant Examiner*—Katharina Schuster
(74) *Attorney, Agent, or Firm*—Conley, Rose & Tayon, P.C.; Michael F. Heim; Jonathan M. Harris

(57) ABSTRACT

A computer system includes a CPU and a memory device coupled by a bridge logic unit. CPU to memory write requests (including the data to be written) are temporarily stored in a queue in the bridge logic unit. The bridge logic unit preferably begins a write cycle to the memory device before all of the write data has been stored in the queue and available to the memory device. By beginning the memory cycle as early as possible, the total amount of time required to store all of the write data in the queue and then de-queue the data from the queue is reduced. Consequently, many CPU to memory write transactions are performed more efficiently and generally with less latency than previously possible.

18 Claims, 5 Drawing Sheets

U.S. PATENT DOCUMENTS

| | | | | |
|---|---|---|---|---|
| 5,764,966 | * | 6/1998 | Mote, Jr. | 713/400 |
| 5,884,040 | * | 3/1999 | Chung | 709/227 |
| 5,905,998 | * | 5/1999 | Ebrahim et al. | 711/144 |
| 5,940,597 | * | 8/1999 | Chung | 711/149 |
| 5,963,504 | * | 10/1999 | Manning | 365/233.5 |
| 5,974,239 | * | 10/1999 | Klein | 710/129 |
| 5,978,297 | * | 11/1999 | Ingalls | 365/225.7 |
| 5,987,555 | * | 11/1999 | Alzien et al. | 710/129 |
| 5,991,833 | * | 11/1999 | Wandler et al. | 710/52 |
| 5,999,481 | * | 12/1999 | Cowles et al. | 365/233 |
| 6,061,759 | * | 5/2000 | Guo | 711/105 |

\* cited by examiner

COMPUTER SYSTEM WITH IMPROVED MEMORY ACCESS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to memory systems in personal computers, and more particularly, to the manner in which memory is accessed. Still more particularly, the invention relates to a computer system in which write transactions from the processor to memory can be optimized by transmitting the data from the processor earlier in the transaction.

2. Background of the Invention

Computer architectures generally include a plurality of devices interconnected by one or more buses. For example, conventional computer systems typically include a central processing unit ("CPU") coupled through bridge logic to main memory. A CPU bus usually is provided to couple the CPU to the bridge logic and a memory bus is provided to couple the bridge logic to the main memory. A main memory controller typically is incorporated within the bridge logic to generate various control signals for accessing the main memory. An interface to a high bandwidth local expansion bus, such as the Peripheral Component Interconnect ("PCI") bus, may also be included as a portion of the bridge logic. Examples of devices which can be coupled to the local expansion bus include network interface cards, video accelerators, audio cards, SCSI adapters and telephony cards, to name a few. An older-style expansion bus also may be supported through yet an additional bus interface to provide compatibility with earlier-version expansion bus adapters. Examples of such expansion buses include the Industry Standard Architectures (ISA) bus, the Extended Industry Standard Architecture ("EISA") bus, and the Microchannel Architecture (MCA) bus. Various devices may be coupled to this second expansion bus including a fax/modem, sound card, keyboard, and mouse. An example of such a bridge logic is described in U.S. Pat. No. 5,634,073, assigned to the assignee of the present invention.

The bridge logic can link or interface the CPU bus, a peripheral bus such as a PCI bus, and the memory bus. In applications that are graphics intensive, a separate peripheral bus optimized for graphics related data transfers may be supported by the bridge logic. An example of such a bus is the Advanced Graphic Port ("AGP") bus. The AGP bus is generally considered a high performance, component level interconnect bus optimized for three dimensional graphical display applications. As one skilled in the art will understand, the AGP bus is based on a set of performance extensions or enhancements to the PCI standard. In part, the AGP bus was developed in response to the increasing demands placed on memory bandwidths for three-dimensional renderings. With the advent of AGP, a graphics controller can be removed from the PCI bus (where it traditionally was located) to the AGP bus. AGP provides greater bandwidth for data transfer between a graphics accelerator and system memory than is possible with PCI or other conventional bus architectures. The increase in data rate provided by the AGP bus allows some of the three dimensional rendering data structures, such as textures, to be stored in main memory, reducing the cost of requiring large amounts of dedicated memory for the graphics accelerator or frame buffer.

An important consideration for computer system designers is performance. Increases in performance are obtained from several cooperating factors. First, increasing the operating speed (i.e., clock frequency) of the computer system enables the computer to do more operations per unit time. Of course providing microprocessors that operate with faster internal clock signals does little to increase performance unless the rest of the computer system experiences a similar increase in operating speed. For example, a processor may be capable of storing data (also referred to as "writing" data) in memory at extremely high speed. Unless the memory is capable of receiving the data at the same rate, however, the processor must slow down to the speed of the memory. Memory device manufacturers can help remedy this problem by providing faster memory devices. Thus, to provide a computer system with improved performance, computer designers must implement improvements at various levels of the computer system.

Another approach to improving computer performance is to implement faster techniques in the computer for processing data, writing data to memory, reading data from memory, and the like. Such improved techniques can be implemented in computer hardware often without requiring a significant increase in the raw operating speed of the hardware. Because such techniques perform their functions more quickly than previous techniques, the overall performance level of the computer is increased.

An important focal point for computer designers is the interaction between the processor (often referred to as a central processing unit or "CPU" for short) and the computer's main memory. Typically, main memory includes dynamic random access memory ("DRAM") which functions as the working memory of the CPU. Over the past decade, CPU manufacturers have created processors with operating speeds that have increased at a faster rate than DRAM devices. Thus, processors currently are capable of writing data to and reading data from DRAM memory faster than the DRAM is capable of responding. One technique to correct this speed discrepancy problem between CPU's and DRAM devices has been to insert "wait states" into the CPU's operating cycles. A wait state is a pause during which the CPU hesitates before continuing with its transactions. Thus, the CPU effectively can be slowed down to a compatible speed with the DRAM device through the use of wait states. Memory technology, however, has improved to the point where wait states are not needed in every computer system. Nevertheless, improving the CPU to memory transaction time remains a design driver even for computer systems that do not require the use of wait states.

SUMMARY OF THE INVENTION

The deficiencies of the prior art described above are solved in large part by a computer system including a CPU, a memory device, and a bridge logic unit coupling together the CPU and the memory device. The bridge logic unit includes a CPU interface coupled to the CPU and a memory controller coupled to the memory device. A CPU-to-memory data queue couples the CPU interface to the memory controller and provides a temporary storage queue for data written by the CPU to the memory device.

The CPU-to-memory data queue preferably is organized as one or more rows (most preferably four rows) of data storage with each row storing one or more bytes of data More particularly, each row provides storage for 32 bytes of data organized as four quad words, with each quad word representing eight of the 32 bytes. The CPU may store one, two, or four quad words (or less than a quad word, referred to as a sub-quad word) of write data to the CPU-to-memory data queue. The bridge logic unit also includes a CPU-to-memory address queue for storing the memory addresses of the write data stored ("posted") in the CPU-to-memory queue.

The memory device may comprise any type of memory device, such as conventional dynamic random access memory (DRAM) or synchronous DRAM (SDRAM). Most memory devices have specific steps to be followed before a write transaction can be completed. For example, a typical SDRAM write cycle usually includes an activation cycle, a write cycle, and a precharge cycle. Memory technologies typically require the "opening" of that portion (typically referred to as a "page" or "bank") of memory to which the write data is targeted. In conventional DRAM devices, this step is typically necessary before the write data can actually be written to memory. For SDRAM devices this process is usually referred to as "activation." After the data has been written, conventional and synchronous DRAM also require that the opened memory portion be closed upon occurrence of predetermined criteria In SDRAM parlance this process is referred to as "precharge." Activation and precharge (or comparable cycles for other memory types) each typically require one or more clock cycles to execute, thereby slowing down CPU-to-memory transactions. In much the same fashion, requiring a person to open and shut a door increases the amount of time it takes a person to walk through a passageway.

In accordance with one embodiment of the invention, the bridge logic unit posts multiple quad words of write data in multiple clock cycles to the CPU-to-memory data queue. The bridge logic unit also initiates data transfers to the memory device. The bridge logic unit preferably begins a memory cycle, such as an activation cycle for an SDRAM array (or comparable cycles for other memory technologies), at an early stage before all of the write data associated with a write request is posted to the CPU-to-data queue. Starting a memory write cycle early permits the bridge logic to get a "head start" on the CPU-to-memory write cycle, rather than waiting to start the memory cycle until all of the write data is posted to the CPU-to-memory data queue. Preferably, the bridge logic begins the memory cycle once the first quad word of data is posted to the data queue and before the remaining quad words are subsequently posted to the queue.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF A PREFERRED EMBODIMENT

Figure 1:
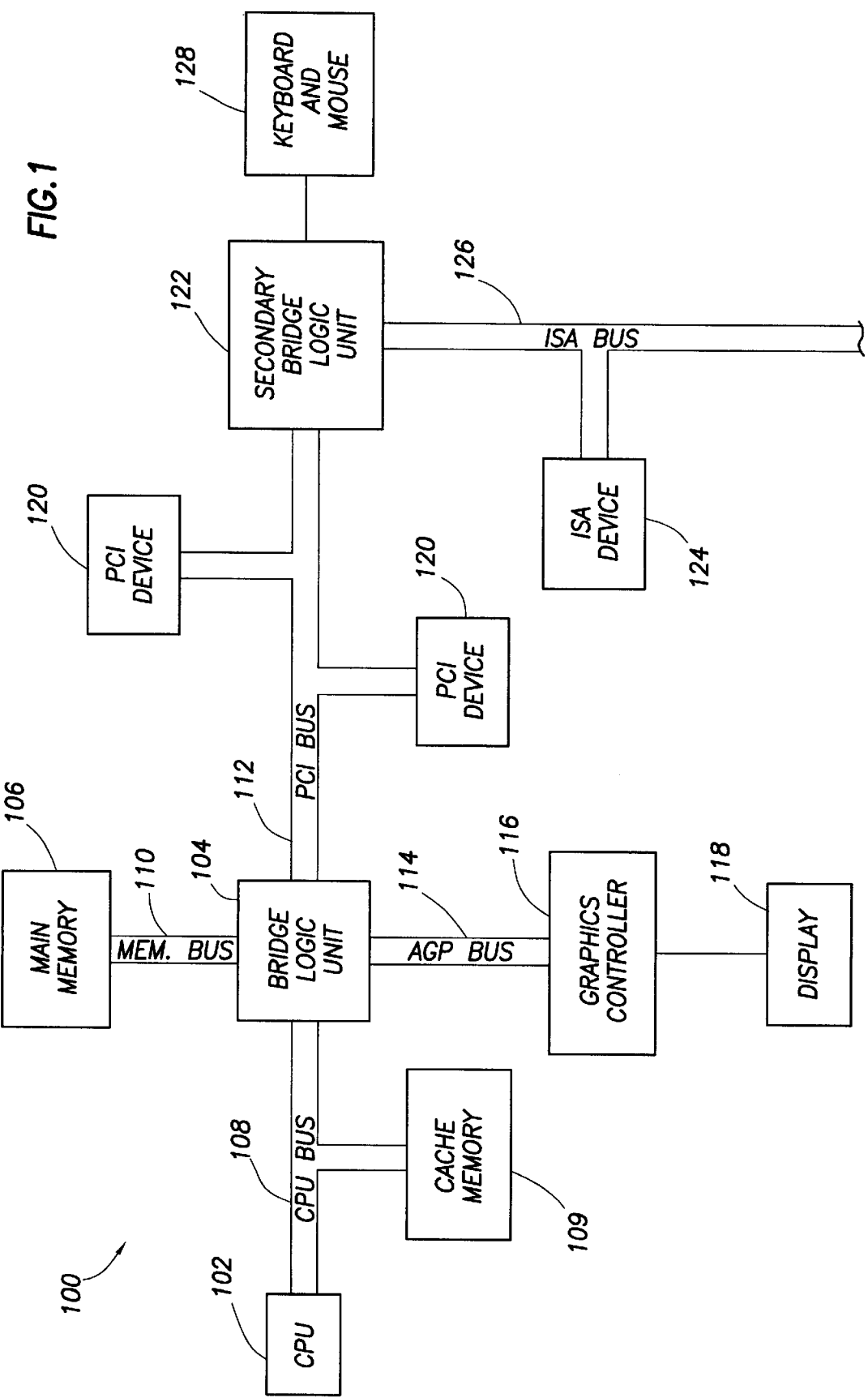
FIG. 1 is a block diagram of a computer system including an integrated bridge logic unit.

Referring now to FIG. 1, a computer system 100 constructed in accordance with a preferred embodiment generally includes a central processing unit ("CPU") 102 coupled to a variety of system components through an integrated bridge logic (or "North bridge") unit 104. The CPU 102 preferably couples to the bridge logic unit 104 via a CPU bus 108. An external memory cache unit 109 may further be coupled to CPU bus 108. As shown in the preferred emobodiment, a main memory 106 couples to the bridge logic unit 104 through a memory bus 110, and a graphics controller 116 couples to the bridge logic unit 104 through an Advanced Graphics Port ("AGP") bus 114. According to normal convention, a display device (or monitor) 118 couples to the graphics controller 116. Additionally, a plurality of Peripheral Component Interconnect ("PCI") devices 120 couple to the bridge logic unit 104 through a PCI bus 112. As one skilled in the art will appreciate, while a PCI bus 112 and PCI devices 120 are shown, other buses and components may be used instead of, or in addition to, that shown in FIG. 1 without departing from the principles of the present invention.

A secondary bridge logic (or "South bridge") unit 122 also preferably is provided to accommodate an electrical interface to one or more peripheral devices 124 by way of an expansion bus 126. The expansion bus 126 may be implemented using any suitable bus type such as an Industry Standard Architecture ("ISA") bus or an Extended Industry Standard Architecture bus ("EISA"). As the exemplary embodiment of FIG. 1 shows, expansion bus 126 is implemented as an ISA bus and, accordingly, peripheral device 124 represents an ISA device such as a fax/modem or sound card.

In addition to providing an interface to an ISA or EISA bus, secondary bridge logic 122 may further incorporate additional functionality, as desired. For example, the preferred embodiment, secondary bridge logic unit 122 includes a master PCI arbiter (not shown) for arbitrating ownership of the PCI bus 112. Secondary bridge logic unit 116 may also incorporate a disk drive controller, an interrupt controller, and power management support functionality. An input/output controller (not shown), either external from or integrated with the secondary bridge logic unit 122, may also be included within computer system 100 to provide operational support for a keyboard and mouse 128 and for various serial and parallel ports, as desired.

Referring still to FIG. 1, the CPU 102 is illustrative of, for example, the Pentium® Pro family of microprocessors. It should be understood, however, that other alternative types of microprocessors could be employed in the present invention. Further, an embodiment of computer system 100 may include a multiple CPU architecture, with a plurality of processors coupled through the CPU bus 108 to the bridge logic unit 104.

The main memory 106 generally includes a conventional memory device or an array of memory devices in which application programs and data are stored. Computer system 100 may include any suitable type of memory, such as dynamic random access memory ("DRAM") or any of the various types of DRAM devices such as synchronous dynamic random access memory ("SDRAM") or extended data out DRAM (EDO DRAM), for example.

The PCI devices 120 may include any of a variety of peripheral devices such as, for example, network interface cards, video accelerators, audio cards, hard or floppy disk drives, Small Computer Systems Interface ("SCSI") adapters and telephony cards. Although only two PCI device 120 are included in the embodiment illustrated in FIG. 1, it should be recognized that computer system 100 may include any number of PCI devices as desired.

Referring still to FIG. 1, the graphics controller 116 controls the rendering of text and images on display 118 according to techniques that are known in the art. Graphics controller 116 may embody a typical graphics accelerator to render three-dimensional data structures on display 118. These data structures can be effectively shifted into and out of main memory 106 after processing and prior to being displayed. The graphics controller 116 therefore may act as a master of the AGP bus 114, meaning that the graphic controller 116 can request and receive access to a target interface within the bridge logic unit 104 to thereby obtain access to main memory 106. A dedicated graphics bus accommodates high speed retrieval of data from main memory 106. For certain operations, the graphics controller 116 may further be configured to generate PCI protocol transactions on the AGP bus 114. The AGP interface of bridge logic 104 may thus include functionality to support both AGP protocol transactions as well as PCI protocol target and initiator transactions. For the purpose of this disclosure, AGP-related transactions (i.e., transactions initiated by or targeted to the AGP bus) following the PCI protocol are referred to as "GCI" transactions. Display 118 is any electronic display device upon which an image or text can be represented. A suitable display 118 may include, for example, a cathode ray tube ("CRT"), a liquid display ("LCD"), a thin film transistor ("TFT") display, or a virtual retinal display ("VRD"), or any other type of suitable display device for a computer system.

The following discussion describes an embodiment of computer system 100 for coupling together various computer buses in accordance with the preferred embodiment. Computer system 100 can be implemented with respect to the particular bus architectures shown in FIG. 1 (i.e., PCI and AGP buses), or other bus architectures, as desired. The embodiment described herein, however, assumes buses 112 and 114 represent a PCI bus and an AGP bus, as shown in FIG. 1. Further, CPU 102 is assumed to be a Pentium® Pro processor and thus CPU bus 108 represents a Pentium Pro bus®. These bus protocols and the terminology used with respect to these protocols are well known to those of ordinary skill in the art. If a more thorough understanding of the PCI, AGP, or Pentium® Pro buses is desired, reference should be made to the *PCI Local Bus Specification* (1993), *Accelerated Graphics Port Interface Specification* (Intel, 1996), and *Intel P6 External Bus Specification*.

Figure 2:
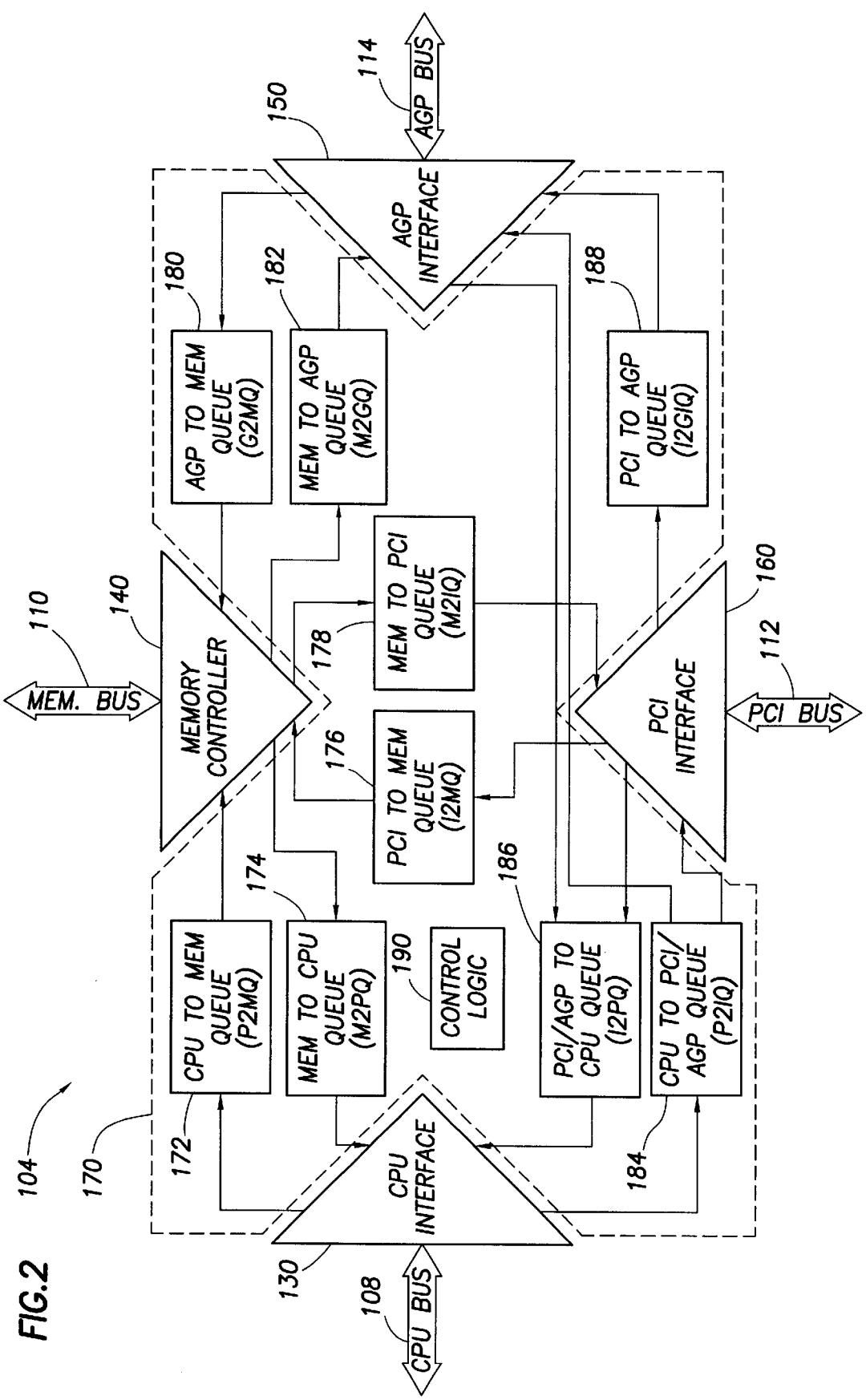
FIG. 2 is a block diagram of a preferred embodiment of the bridge logic unit of FIG. 1 including CPU, PCI, and AGP interfaces, a memory controller, and data and address queues between the interfaces and memory controller.

Referring now to FIG. 2, bridge logic unit 104 generally includes a CPU interface 130, a memory controller 140, an AGP interface 150, a PCI interface 160, and queue storage and control logic 170. As shown, the CPU interface 130 preferably couples the bridge logic unit 104 to the CPU bus 108 and also coordinates the transfer of data, address, and control signals between the bridge logic 104 and CPU bus 108. In a similar fashion, the AGP interface 150 and PCI interface 160 interface the bridge logic 104 to the AGP bus 114 and PCI bus 112, respectively. Finally, the memory controller 140 couples to the memory bus 110.

The queue storage and control logic 170 includes various queue storage elements interconnecting the CPU interface 130, memory controller 140, AGP interface 150, and PCI interface 160. A CPU-to-memory queue (P2MQ) 172 and a memory-to-CPU queue (M2PQ) 174 couple the CPU interface 130 to the memory controller 140. A PCI-to-memory queue (I2MQ) 176 and a memory-to-PCI queue (M2IQ) 178 couple the PCI interface 160 to the memory controller 140. An AGP-to-memory queue (G2MQ) 180 and a memory-to-AGP queue (M2GQ) 182 couple the AGP interface 150 to the memory controller 140. The AGP interface 150 and the PCI interface 160 couple by way of a PCI-to-AGP queue (I2GIQ) 188. A CPU-to-PCI/AGP queue (P2IQ) 184 and a PCI/AGP-to-CPU queue (I2PQ) 186 couple the CPU interface 130 to the AGP interface 150 and the PCI interface 160 as shown. A control logic unit 190 controls the operation of the various queue storage elements. The input and output connections to the control logic unit 190 have been omitted from FIG. 2 for sake of clarity. Also omitted from the block diagram of FIG. 2 are various control signals between the interfaces 130, 150, 160 and memory controller 140. The relevant control signals, however, are shown in FIG. 3 and discussed in detail below.

Generally, the queue storage elements allow data and data transaction requests (such as CPU reads and writes to memory, PCI reads and writes to memory, etc.) to be temporarily stored pending execution by the destination device, thereby permitting the requesting device to perform other tasks until its transaction request is completed.

Figure 3:
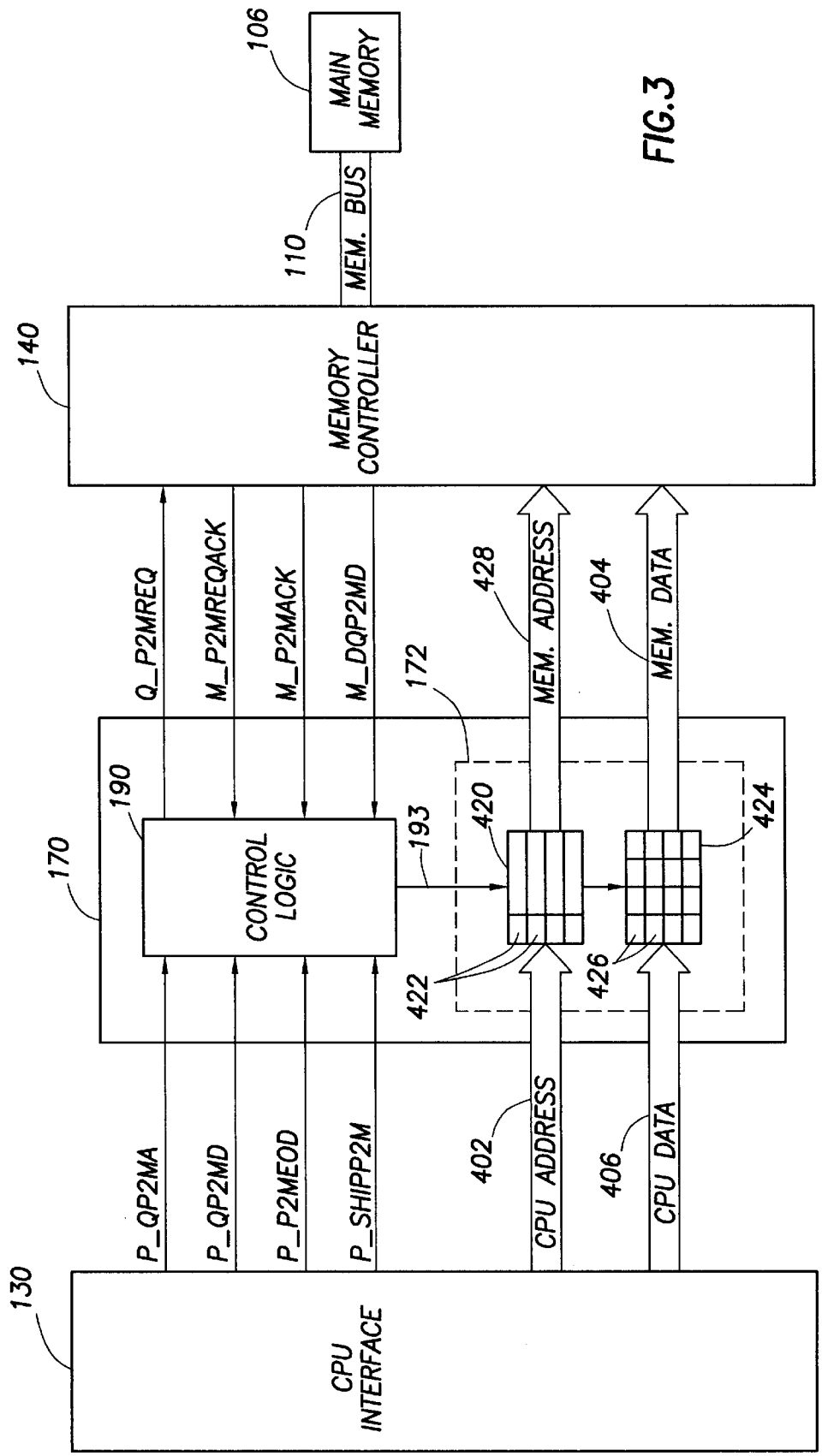
FIG. 3 is a block diagram of an exemplary implementation of a CPU to memory write transaction.

Referring now to FIG. 3, an exemplary CPU-to-memory write cycle is illustrated. The CPU interface 130, the memory controller 140, and the queue logic and control 170 are coupled via a number of address and data buses as well as various control signals. Specifically, the queue logic and control 170 couples to the CPU interface 130 via a CPU address bus 402, CPU data bus 406, and at least four control signal lines including P_QP2MA, P_QP2MD, P_P2MEOD, and P_SHIPP2M. The queue logic and control 170 couples to the memory controller 140 via a memory address bus 428, a memory data bus 404, and at least four control signals including Q_P2MReq, M_P2MReqAck, M_P2Mack, and M_DQP2MD. The CPU interface 130 couples to the memory controller via CPU address bus 402 and the control signals P_MRdReq, M_M2PReqAck, M_M2PAck, and M_M2PRdy.

The CPU-to-memory queue 172 includes an address portion or queue 420 and a data portion or queue 424. The address queue 420 preferably is four address locations deep and the data queue preferably is four cache lines deep. Each cache line includes four quad words wherein each quad word includes eight bytes. Thus each cache line preferably is capable of storing 32 bytes. Using the various control signals, the CPU interface 130 places the memory location address associated with the write data on the CPU address bus 402 for storage in one of the address locations 422 comprising the address queue 420. The write data included in the write request is placed on the CPU data bus 406 by the CPU interface 130 and stored in a cache line 426 of the data queue 424. The control logic 190 identifies the address location 422 and cache line 426 where write data from the CPU interface 130 is to be placed by signals transmitted over lines 193. The signals on lines 193 operate as a pointer to the appropriate address location and cache line. It should be understood that in addition to the address, other information, including byte enables, a valid bit, AGP translated address and chip select decodes, are stored either in the address queue 420 and/or data queue 424.

When the CPU interface 130 decodes a CPU cycle as a write cycle, it preferably asserts the P_QP2MA signal and places the write address on the CPU address bus 402. The P_QP2MA signal indicates to the control logic 190 that it should latch the address on the CPU address bus 402 into the location 422 in the address queue indicated by the address pointer asserted by the control logic 190 on lines 193. The CPU interface 130 also asserts the P_QP2MD signal to the control logic 190 to command the control logic 190 to latch in the write data from the CPU data bus 406. The write data is placed in a cache line 426 determined by the pointer value from control logic 190. The write data may be all of, or part of, a complete cache line of data The CPU interface 130 preferably asserts the P_QP2MD signal while all of the write data is being written ("posted") to data queue 424 via the CPU interface 130. The CPU 102 (FIG. 1) may post four quad words, two quad words, one quad word, or a sub-quad word of data to data queue 424 via the CPU interface 130. If the CPU interface 130 posts a sub-quad word (i.e., eight bytes or less) of data, the byte enables that are also posted to the address queue 420 or data queue 424 to indicate which bytes in the sub-quad word represent valid write data, as one of ordinary skill in the art would understand. The queue storage and control logic 170 latches the write data into the data queue 424 on one or more cycles of the clock signal (not shown).

When the last quad word of a transaction is provided to the data queue 424, the CPU interface 130 asserts the P_P2MEOD signal indicating to the control logic 190 that the cycle is complete and no more write data is forthcoming. In response to the assertion of the P_P2MEOD signal, the control logic adjusts its pointers to prepare for the next write transaction (e.g., increment the row data pointer to point to the next cache line in which write data will be placed).

In accordance with a preferred embodiment of computer system 100, the CPU interface 130 asserts the P_SHIPP2M signal once the first quad word of data is posted to the data queue 424, provided the system knows that the processor will not add wait states between data phases for the transaction. If only one quad word or less of data is to be written to memory, then the CPU interface 130 preferably asserts the P_SHIPP2M signal once the data is posted to the data queue 424. In response to the P_SHIPP2M signal, the control logic 190 asserts the Q_P2MREQ signal to the memory controller 140 directing the memory controller 140 to begin its memory cycle. When the memory controller 140 determines that the CPU write request has the highest priority among all other pending memory access cycles, if any, the memory controller 140 asserts the M_P2MREQACK signal to the control logic 190 to inform the control logic that the write cycle will be the next memory cycle run by the memory controller 140. Once the memory cycle has begun, the memory controller asserts M_P2MACK to the control logic 190 to notify the control logic to increment its pointer 193. If there are no other addresses stored in the address queue 420, the Q_P2MREQ signal is deasserted.

Figure 4:
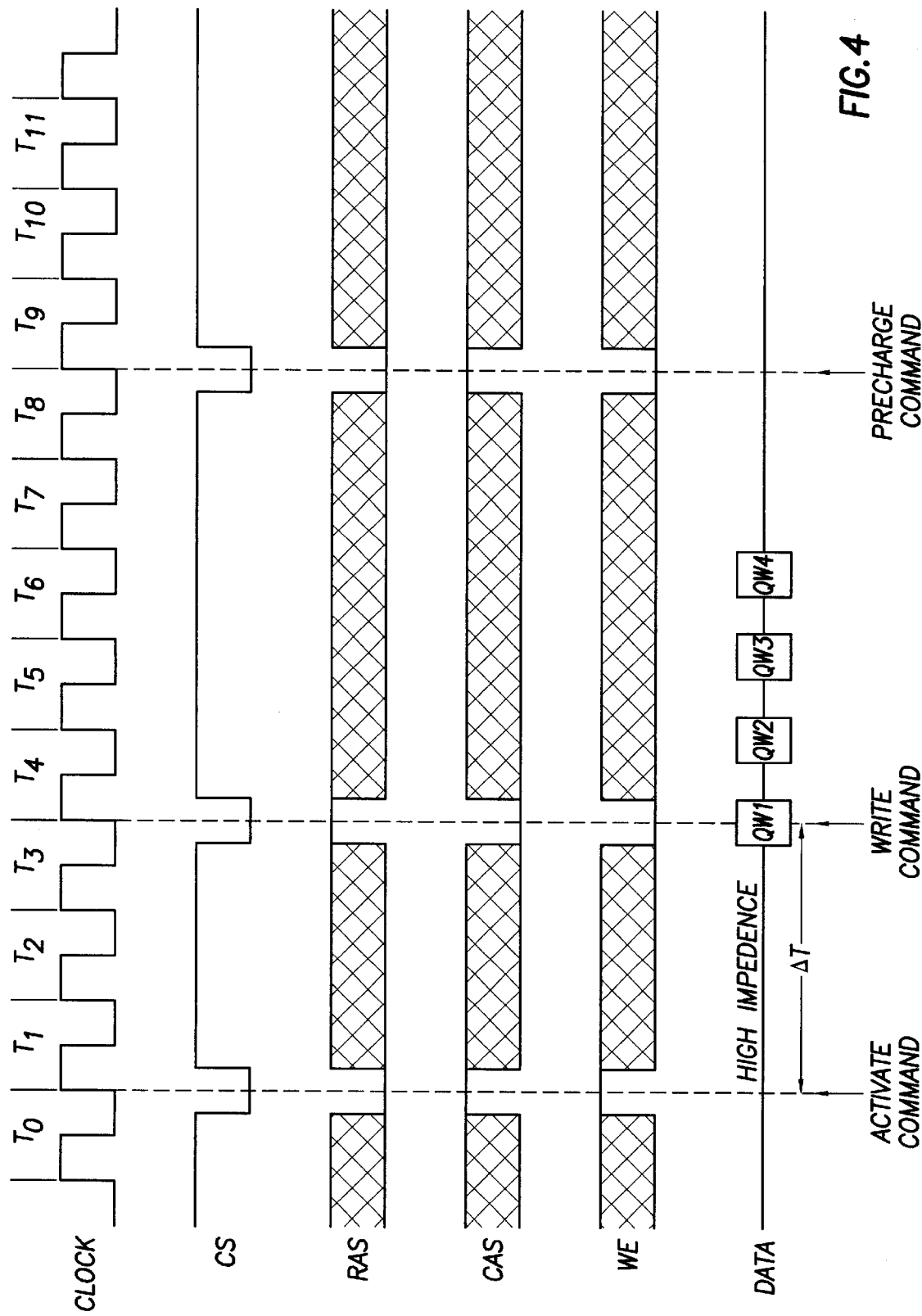
FIG. 4 is an exemplary timing diagram of an SDRAM write cycle.

By asserting the P_SHIPP2M signal before all of the write data is posted to the data queue 424, computer system 100 advantageously permits the main memory to concurrently initiate its process for writing the data. The following discussion with respect to FIG. 4 illustrates a typical memory controller-to-memory write cycle. At least a portion of such a write cycle may begin before all of the write data is posted to the data queue 424. In general, a preferred embodiment of the invention permits a portion of a write cycle between a memory controller and main memory to begin early, before all of the write data is posted to the data queue 424. The preferred embodiment is illustrated with respect to the exemplary write cycle of FIG. 4, but can be easily adapted to other write cycle protocols.

A typical write cycle to memory involves multiple steps. The first step usually requires "opening" the portion of memory into which the data will be written. Once the target address of the data is known, the first step can begin even though not all of the write data is ready.

By way of example, a typical SDRAM write cycle will now be described for purposes of illustration, with the understanding that the present invention is not intended to be limited to an SDRAM memory system. Referring now to FIG. 4, an SDRAM write cycle generally requires a clock signal and chip select (CS), row address strobe (RAS), column address strobe (CAS), and write enable (WE) control signals. The CS, RAS, CAS, and WE signals are control signals preferably included as part of the memory bus 110 signal (FIG. 3). The exemplary write cycle for the SDRAM generally begins with the assertion of an activate command to the SDRAM on the rising edge of clock cycle T1. The memory controller 140 (FIG. 2) provides the activate command by asserting the CS signal (which is asserted for all SDRAM commands) and asserting the RAS signal low and asserting the CAS and WE signals high. The SDRAM accordingly decodes the RAS, CAS, and WE signals as an activate command. The SDRAM responds by performing the activate command by opening the bank and row in the SDRAM corresponding to the address of the write request. The address signals have been omitted from FIG. 4 for sake of clarity.

Referring still to FIG. 4, once the activate command begins at clock cycle T1, the memory controller 140 preferably provides a write command to the SDRAM to latch in the write data. The memory controller 140 encodes the write command using the RAS, CAS, and WE signals at the rising edge of clock cycle T4. As shown, these signals are encoded as RAS high and CAS and WE low. At this point (clock cycle T4), the SDRAM has been activated and is ready to receive the write data (quad words QW1, QW2, QW3, QW4) as shown in on the rising edges of clock cycle T4 and subsequent cycles.

The time $\Delta T$ between the activate and write commands (often referred to $t_{rcd}$) is a function of the particular SDRAM device included in computer system 100. This time, $\Delta T$, is a minimum time after the start of the activate command before the memory controller 140 may issue a write command. Because the write data is not needed until $\Delta T$ seconds after the start of the activate command, the memory controller 140 preferably directs the main memory 106 (if implemented as SDRAM) to activate after the first quad word is posted to the data queue 424. The SDRAM can then activate while the remaining quad words are being posted to the data queue 424. Accordingly, a CPU-to-memory write cycle can be completed in less time than in previous computer systems in which DRAM activation begins only after all of the write data is available to the memory controller.

Referring still to FIG. 4, the memory controller 140 may issue a precharge command to the SDRAM at clock cycle T9. The precharge command closes a desired row within a bank of memory. Alternatively, a memory write cycle may begin with a precharge command rather than an activate command as shown in FIG. 4. Such a situation is warranted when a maximum number of rows are already open (the maximum number is defined for each SDRAM device) and a new row within a bank is to receive write data. One of the rows presently opened must first be closed by a precharge cycle before activating the new row. The preferred embodiment of computer system 100 discussed above advantageously permits a precharge cycle to begin before all of the write data is posted to data queue 424. If the current cycle, however, is a write to an open bank, the write must be completed before the precharge can occur.

Figure 5:
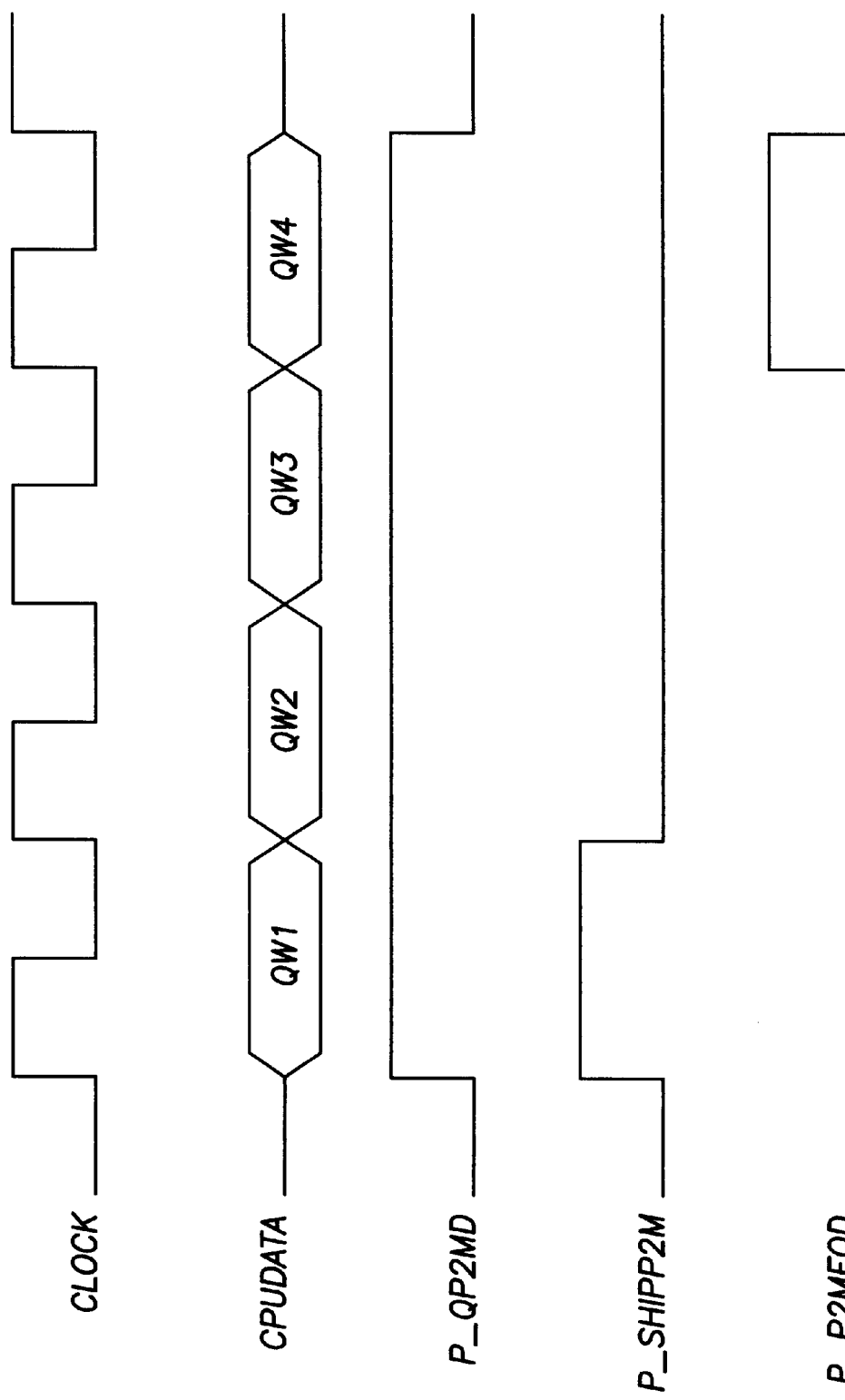
FIG. 5 is an exemplary timing diagram illustrating the start of a memory write cycle before all of the write data is posted to the CPU to memory write queue.

FIG. 5 illustrates the relative timing of the quad words being posted to the data queue 424 (four quad words QW1–QW4 in the example of FIG. 5) and the assertion of the P_SHIPP2M signal by the CPU interface 130 to initiate a write to memory cycle early. As shown, the CPU interface asserts P_QP2MD to signal that data is available for latching into queue 172. The CPU interface 130 also preferably asserts the P_SHIPP2M signal approximately coincident with the first quad word QW1 being posted to the data queue 424. If preferred, however, the P_SHIPP2M signal can be asserted at other times while the CPU interface 130 is posting the data to the data queue 424. The CPU interface asserts P_P2MEOD to indicate that the last quadward is being stored in the queue.

Once time ΔT has passed the memory controller 140 preferably asserts the M_DQP2MD signal (FIG. 3) to the control logic 190 to begin de-queuing the write data from the data queue 424. The data is de-queued from the data queue 424 a quad word at a time until all of the data associated with the current write cycle is de-queued.

The benefit of computer system 100 to begin a memory write cycle before all of the write data is ready to be written to memory was illustrated above with respect to an exemplary SDRAM write cycle. However, initiating a memory write cycle early applies generally to any memory technology, such as conventional DRAM, that requires an initial phase to prepare for receiving data Conventional DRAM, for example, requires that an appropriate page of memory be opened before data is written to that page. Further, the principles described above with respect to CPU-to-memory write cycles also apply to AGP-to-memory, PCI-to-memory write cycles or generally any write cycles to memory. As such, PCI and AGP write queues 176 and 180 will assert memory request control signals (like Q_P2MREQ in FIG. 3) to initiate write cycles to main memory 106 preferably before all of the write data is available in the queues 176, 180. Such memory request signals are asserted by control logic 190 in response to ship-to-memory signals asserted by interfaces 176, 180 when a portion of the write data is posted to a data queue.

Implementing an embodiment of the invention in a computer that inserts wait states in the timing associated with memory write transfers may cause timing problems for the data transactions on the memory bus. Accordingly, computer system 100 determines whether the CPU 102 implements wait states during the boot-up process in accordance with known techniques. For example, the CPU 102 may include a register which identifies whether, and if so how many, wait states are implemented. That register preferably is interrogated during boot-up.

If wait states are implemented, computer system 100 may disable the early write cycle initiation feature. In this case, the memory controller-to-memory write cycle will not begin until all of the quad words of write data are posted to data queue 424. In this case, the CPU interface 130 asserts the P_SHIPP2M signal when the last quad word of data is posted to the data queue 424.

Numerous variations and modifications will become apparent to those skilled in the art once the above disclosure is fully appreciated. It is intended that the following claims be interpreted to embrace all such variations and modifications.

We claim:

1. A computer system, comprising:
a CPU;
a system main memory; and
an interface coupling said CPU and said main memory, said interface apparatus including:
a memory controller that connects to said main memory and which controls write transactions to the memory device; and
a CPU interface coupled to said memory controller, said CPU interface being capable of initiating a write transaction to said main memory before all of the data to be written is available to the memory controller.

2. A computer system as in claim 1 wherein said interface apparatus further includes a data queue coupled between said CPU interface and said memory controller.

3. A computer system as in claim 2 wherein said data queue includes a plurality of multi-byte storage rows for storing data to be written to said memory device by said CPU.

4. A computer system as in claim 3 wherein each of said multi-byte storage rows is capable of storing four quad words.

5. A computer system as in claim 4 wherein said interface initiates a write transaction to said main memory once a first of said plurality of quad words is stored in said data queue and before the remaining quad words are stored in said data queue.

6. A computer system as in claim 5 wherein said interface also includes control logic operatively coupled to said data queue and to said CPU interface, and wherein said CPU interface initiates said memory write cycle by asserting a control signal to said control logic.

7. A computer system as in claim 6 wherein said control logic asserts a request signal to said memory controller when said CPU interface asserts said control signal.

8. A computer system as in claim 7 wherein said main memory comprises a synchronous dynamic random access memory (SDRAM).

9. A computer system as in claim 8 wherein said memory controller initiates an activate command to said SDRAM upon receipt of said request signal.

10. A computer system as in claim 1 wherein said interface includes an expansion bus interface and said computer system includes an expansion bus coupled to said expansion bus interface, said expansion bus capable of providing data to be written to said main memory.

11. A computer system as in claim 10 wherein said interface includes a data queue coupled between said expansion bus interface and said memory controller, said data queue including a plurality of multi-byte storage rows for storing data to be written to said memory device by said expansion bus.

12. A computer system as in claim 11 wherein each of said multi-byte storage rows is capable of storing four quad words.

13. A computer system as in claim 12 wherein said interface initiates a write transaction to said memory device once a first of said plurality of quad words is stored in said data queue and before the remaining quad words are stored in said data queue.

14. A computer system as in claim 13 wherein said interface also includes control logic operatively coupled to said data queue and to said expansion bus interface, said expansion bus interface initiates said memory write cycles by asserting a control signal to said control logic which then asserts a request signal to said memory controller.

15. A computer system comprising:

a CPU;

a main memory device capable of storing data; and an interface coupling said CPU and said main memory device, said interface including:
   a memory controller that connects to said main memory device and which controls write transactions to the main memory device;
   a CPU interface coupled to said memory controller, said CPU interface being capable of initiating a write transaction before all of the data to be written is available to the memory controller;
   a CPU-to-memory data queue coupled to said CPU interface and said memory controller for temporarily storing a plurality of data portions to be written to the main memory device;
   said CPU interface capable of initiating a write transaction to the main memory device before all of said data portions are stored in said CPU-to-memory data queue.

16. A computer system as in claim 15 wherein said interface further includes a CPU to memory address queue which temporarily stores a plurality of memory addresses associated with said plurality of data portions stored in said data queue.

17. A computer system as in claim 15 wherein said computer system includes an expansion bus capable of providing data to be written to said memory device and said interface includes an expansion bus interface coupled to said expansion bus.

18. A computer system as in claim 17 wherein said interface also includes an expansion bus-to-memory data queue for temporarily storing a plurality of data portions to be written to said main memory device and said expansion bus interface is capable of initiating a write transaction to the memory device before all of said data portions are stored in said expansion bus-to-memory data queue.

* * * * *